(12) United States Patent
Ueno

(10) Patent No.: US 11,735,181 B2
(45) Date of Patent: Aug. 22, 2023

(54) VOICE INPUT APPARATUS, CONTROL METHOD THEREOF, AND STORAGE MEDIUM FOR EXECUTING PROCESSING CORRESPONDING TO VOICE INSTRUCTION

(71) Applicant: CANON KABUSHIKI KAISHA, Tokyo (JP)

(72) Inventor: Daiyu Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 17/156,885

(22) Filed: Jan. 25, 2021

(65) Prior Publication Data

US 2021/0241765 A1   Aug. 5, 2021

(30) Foreign Application Priority Data

Feb. 5, 2020   (JP) ................. 2020-018210

(51) Int. Cl.
*G10L 15/22*   (2006.01)
*G10L 15/08*   (2006.01)
*G06F 3/16*    (2006.01)

(52) U.S. Cl.
CPC .............. *G10L 15/22* (2013.01); *G06F 3/167* (2013.01); *G10L 15/08* (2013.01); *G10L 2015/088* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 9,542,941 B1* | 1/2017 | Weksler | G10L 15/22 |
| 2014/0225660 A1* | 8/2014 | Cheng | G06F 3/017 |
| | | | 327/509 |
| 2017/0169817 A1* | 6/2017 | VanBlon | G10L 15/02 |
| 2019/0066680 A1* | 2/2019 | Woo | G10L 15/08 |
| 2019/0333501 A1* | 10/2019 | Kurtz | G10L 21/0216 |
| 2019/0371342 A1* | 12/2019 | Tukka | H04W 52/0229 |
| 2019/0371343 A1* | 12/2019 | Tukka | G10L 17/22 |
| 2020/0020337 A1* | 1/2020 | Lee | G06F 3/013 |
| 2020/0051554 A1* | 2/2020 | Kim | G06F 3/167 |
| 2020/0380994 A1* | 12/2020 | Luo | G10L 17/00 |
| 2021/0127003 A1* | 4/2021 | Bai | G10L 15/16 |
| 2021/0151039 A1* | 5/2021 | Wu | G06F 40/30 |
| 2021/0151057 A1* | 5/2021 | Sinha | G10L 25/51 |
| 2021/0241765 A1* | 8/2021 | Ueno | G10L 15/08 |

(Continued)

FOREIGN PATENT DOCUMENTS

| | | | |
|---|---|---|---|
| JP | 2002351493 A | 12/2002 | |
| JP | 2019086535 A | 6/2019 | |

*Primary Examiner* — Jonathan C Kim
(74) *Attorney, Agent, or Firm* — Rossi, Kimms & McDowell LLP

(57) ABSTRACT

A voice input apparatus includes a voice input device configured to input voice and performs control to, in a case where a second voice instruction for operating the voice input apparatus is input in a predetermined period after a first voice instruction is input to the voice input apparatus, execute processing corresponding to the second voice instruction. The voice input apparatus changes a length of the predetermined period, according to the first voice instruction.

9 Claims, 11 Drawing Sheets

| VOICE INSTRUCTION | VOICE RECEPTION PERIOD OF RECOMMENDED SETTING | VOICE RECEPTION PERIOD OF RECOMMENDED SETTING | VOICE RECEPTION PERIOD OF AUTOMATIC SETTING |
|---|---|---|---|
| GUIDANCE PAGE FORWARD | 60 SECONDS | 50 SECONDS | 70 SECONDS |
| PHOTO PAGE FORWARD | 20 SECONDS | 15 SECONDS | 20 SECONDS |
| CHECK Tv VALUE | 5 SECONDS | 5 SECONDS | 5 SECONDS |
| CHECK Av VALUE | 5 SECONDS | 8 SECONDS | 5 SECONDS |

(56) References Cited

U.S. PATENT DOCUMENTS

2021/0241766 A1\* 8/2021 Ueno ................ H04N 23/63
2021/0243354 A1\* 8/2021 Ueno ................ H04N 23/61
2022/0357915 A1\* 11/2022 Iwase ................ G06F 3/167

\* cited by examiner

FIG. 4A

| VOICE RECEPTION PERIOD SETTING SCREEN | |
|---|---|
| GUIDANCE PAGE FORWARD | USER SETTING (50 SECONDS) |
| PHOTO PAGE FORWARD | RECOMMENDED SETTING (20 SECONDS) |
| CHECK Tv VALUE | AUTOMATIC SETTING (5 SECONDS) |
| CHECK Av VALUE | RECOMMENDED SETTING (5 SECONDS) |

FIG. 4B

| VOICE RECEPTION PERIOD SETTING SCREEN | RECOMMENDED SETTING (60 SECONDS) |
|---|---|
| GUIDANCE PAGE FORWARD | USER SETTING (50 SECONDS) |
| | AUTOMATIC SETTING (70 SECONDS) |

USER SETTING NUMBER OF SECONDS CAN BE CHANGED BY TURNING DIAL

FIG. 5A

| VOICE INSTRUCTION | VOICE RECEPTION PERIOD OF RECOMMENDED SETTING | VOICE RECEPTION PERIOD OF RECOMMENDED SETTING | VOICE RECEPTION PERIOD OF AUTOMATIC SETTING |
|---|---|---|---|
| GUIDANCE PAGE FORWARD | 60 SECONDS | 50 SECONDS | 70 SECONDS |
| PHOTO PAGE FORWARD | 20 SECONDS | 15 SECONDS | 20 SECONDS |
| CHECK Tv VALUE | 5 SECONDS | 5 SECONDS | 5 SECONDS |
| CHECK Av VALUE | 5 SECONDS | 8 SECONDS | 5 SECONDS |

FIG. 5B

| VOICE INSTRUCTION | VOICE RECEPTION PERIOD OF AUTOMATIC SETTING | VOICE INSTRUCTION RECEPTION PERIOD OF PREVIOUS TIME | VOICE INSTRUCTION RECEPTION PERIOD OF CURRENT TIME |
|---|---|---|---|
| GUIDANCE PAGE FORWARD | 70 SECONDS | 08:00:00 | 08:01:10 |
| PHOTO PAGE FORWARD | 20 SECONDS (RECOMMENDED SETTING) | NONE | 09:00:57 |
| CHECK Tv VALUE | 5 SECONDS | 14:00:00 | 14:00:05 |
| CHECK Av VALUE | 5 SECONDS (RECOMMENDED SETTING) | NONE | 13:00:00 |

FIG. 8A

VOICE INPUT HELP GUIDE (1/30)

WHEN WAKE WORD IS SPOKEN TO CAMERA, VOICE INPUT RECEPTION STARTS.
VOICE RECEPTION PERIOD WILL CHANGE ACCORDING TO CONTENT OF WAKE WORD.

| END TEXT | NEXT PAGE |

FIG. 8B

VOICE INPUT HELP GUIDE (2/30)

IF "LONG TIME" IS NOT INCLUDED IN WAKE WORD, RECEPTION WILL BE 5 SECONDS.
IF "LONG TIME" IS INCLUDED IN WAKE WORD, RECEPTION WILL BE 60 SECONDS.

| END TEXT | PREVIOUS PAGE | NEXT PAGE |

FIG. 8C

VOICE INPUT HELP GUIDE (30/30)

DETAILS OF COMMAND CORRESPONDING TO VOICE INPUT ARE DEFINED ON HOMEPAGE.
PLEASE CHECK THERE AS WELL.

| END TEXT | PREVIOUS PAGE |

VOICE INPUT APPARATUS, CONTROL METHOD THEREOF, AND STORAGE MEDIUM FOR EXECUTING PROCESSING CORRESPONDING TO VOICE INSTRUCTION

BACKGROUND OF THE INVENTION

Field of the Invention

The present invention relates to a voice input apparatus, a control method thereof, and a storage medium for executing processing corresponding to a voice instruction.

Description of the Related Art

In recent years, apparatuses provided with a voice operation function that is able to recognize spoken voice inputs and perform operations corresponding to the voice inputs are known. For example, an operation for displaying desired pages for viewing, an operation for changing the current setting values of the apparatus, an operation for displaying the weather or temperature, and an operation for calling a specific person or inputting the text of an e-mail message can be performed by the voice operation function using voice. While the voice operation function has the advantage of enabling operations to be performed with natural speech, the apparatus may also react to unintended voice, resulting in erroneous operations.

Japanese Patent Laid-Open No. 2019-86535 proposes a technology for reducing the occurrence of erroneous operations, by a voice operable apparatus receiving a specific voice command called a wake word for enabling voice operations and receiving voice operations for only a predetermined period after the wake word. Also, Japanese Patent Laid-Open No. 2002-351493 proposes a technology that, in order to operate a plurality of controlled devices, varies a reception period of voice inputs according to the period in which a member operation is performed, and enables voice inputs received in the reception period.

With the technology proposed by Japanese Patent Laid-Open No. 2019-86535, the period for which voice operations are enabled is a fixed period determined in advance, and there are cases where, depending on the function to be operated, the enabled period of voice operations is too short to give appropriate operation instructions, and cases where the enabled period is too long, resulting in unintended voice being input. For example, with an operation for displaying desired pages, the task of looking through the text is sandwiched between the pervious voice operation and the next voice operation, and thus it is presumed that the next voice operation will be generated after a comparatively long period from the previous voice operation. In this case, it is conceivable that the operability of the user is reduced when the period for which voice operations are enabled is too short. On the other hand, with voice operations for checking and changing the temperature or a setting value, it is presumed that, after the operation for checking the temperature or setting value, the next voice operation for changing the temperature or setting value will be continuously performed within a comparatively short period. In this case, the enabled period of voice operations may be short, and, when too long, there is a possibility of unintended voice being picked up and erroneous operations occurring.

Also, the technology proposed by Japanese Patent Laid-Open No. 2002-351493 merely proposes varying the reception period of voice inputs according to the period in which member operations are performed, and does not take into consideration improving the operability of voice operations according to input voice instructions.

SUMMARY OF THE INVENTION

The present disclosure has been made in consideration of the aforementioned issues, and realizes a technology capable of improving the operability of voice operations according to input voice instructions.

In order to solve the aforementioned problems, one aspect of the present disclosure provides a voice input apparatus comprising: a voice input device configured to input voice; one or more processors; and a memory storing instructions which, when the instructions are executed by the one or more processors, cause the voice input apparatus to function as: a control unit configured to perform control to, in a case where a second voice instruction for operating the voice input apparatus is input in a predetermined period after a first voice instruction is input to the voice input apparatus, execute processing corresponding to the second voice instruction, wherein the control unit changes a length of the predetermined period, according to the first voice instruction.

Another aspect of the present disclosure provides, a control method of a voice input apparatus, the voice input apparatus comprising a voice input device configured to input voice, the control method comprising: performing control to, in a case where a second voice instruction for operating the voice input apparatus is input in a predetermined period after a first voice instruction is input to the voice input apparatus, execute processing corresponding to the second voice instruction, in the controlling, a length of the predetermined period is changed, according to the first voice instruction.

Still another aspect of the present disclosure provides, a non-transitory computer-readable storage medium comprising instructions for performing a control method of a voice input apparatus, the voice input apparatus comprising a voice input device configured to input voice, the control method comprising: performing control to, in a case where a second voice instruction for operating the voice input apparatus is input in a predetermined period after a first voice instruction is input to the voice input apparatus, execute processing corresponding to the second voice instruction, in the controlling, a length of the predetermined period is changed, according to the first voice instruction.

According to the present invention, it becomes possible to improve the operability of voice operations according to input voice instructions.

Further features of the present invention will become apparent from the following description of exemplary embodiments (with reference to the attached drawings).

BRIEF DESCRIPTION OF THE DRAWINGS

FIGS. 4A and 4B are diagrams showing an example of a voice reception period setting screen of the present embodiment in a non-setting state and a setting state.

FIGS. 5A and 5B are diagrams showing an example of tables of the present embodiment that are referenced.

FIGS. 8A to 8C are diagrams showing an example of a top page, a middle page and an end page of a help guide screen of the present embodiment.

DESCRIPTION OF THE EMBODIMENTS

Figure 1A:
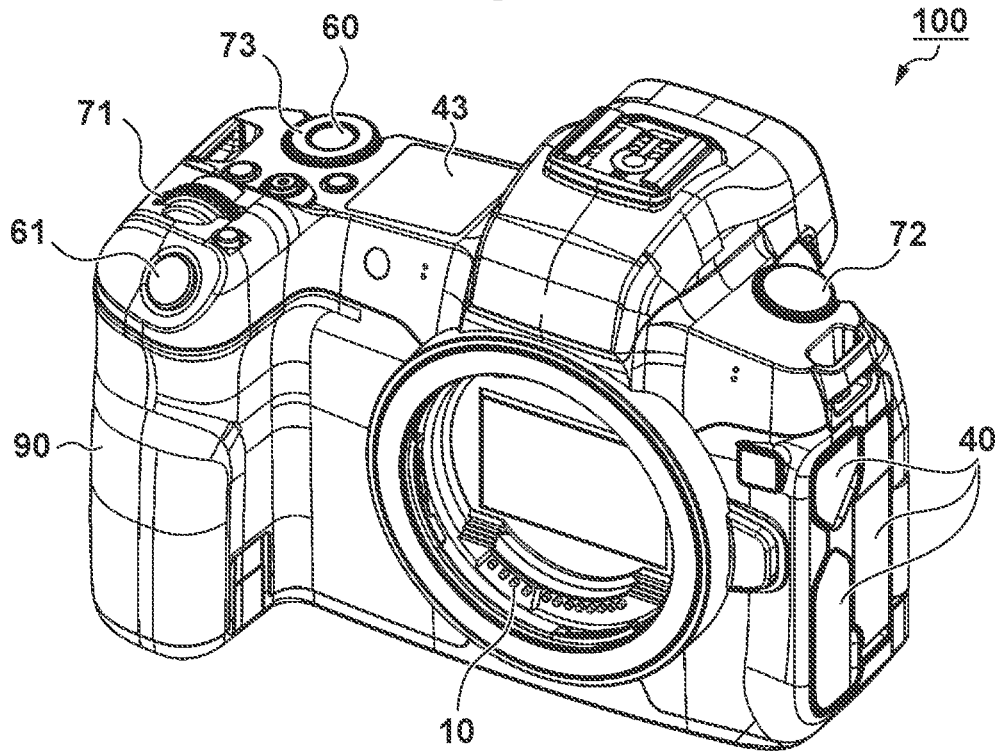
FIGS. 1A and 1B are diagrams showing an external appearance of a digital camera serving as an example of a voice input apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

Hereinafter, an example using a digital camera capable of operations using voice recognition as an example of a voice input apparatus will be described. However, the present embodiment is applicable not only to digital cameras but also to other devices capable of operations using voice recognition. These devices may include smartphones, personal computers, game machines, tablet terminals, music players and medical equipment, for example.

Configuration of Digital Camera

Figure 1B:
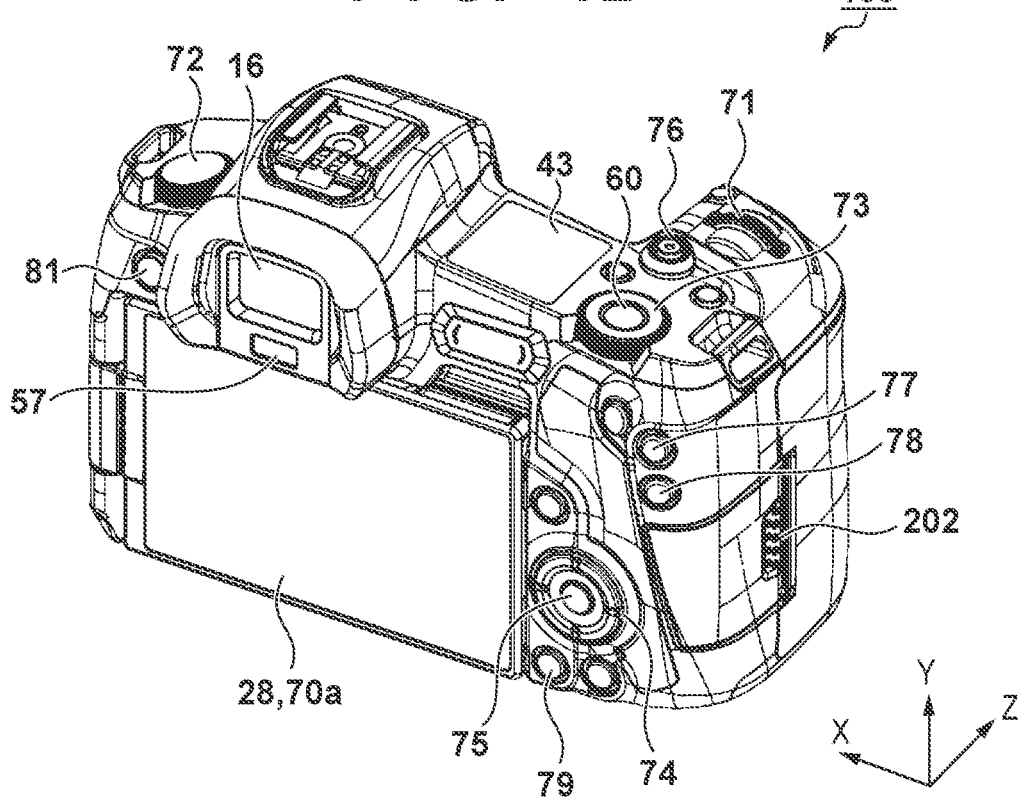

FIG. 1A and FIG. 1B show an external view of a digital camera 100 serving as an example of a voice input apparatus according to the present embodiment. FIG. 1A is a front perspective view of the digital camera 100, and FIG. 1B is aback perspective view of the digital camera 100. A display unit 28 is a display unit that is provided on a camera back surface and displays images and a variety of information. A touch panel 70a is able to detect touch operations on the display surface (operation surface) of the display unit 28. A viewfinder external display unit 43 is a display unit provided on a camera upper surface, and various setting values of the camera including shutter speed and aperture are displayed. A shutter release 61 is an operation unit for giving a shooting instruction. A mode changeover switch 60 is an operation unit for switching between various modes. A terminal cover 40 is a cover that protects a connector (not shown) for connecting a connecting cable of an external device to the digital camera 100.

A main electronic dial 71 is a rotary operation member that is included in an operation unit 70, and processing such as changing shutter speed, aperture and other setting values is possible, by turning this main electronic dial 71. A power switch 72 is an operation member that switches ON and OFF power of the digital camera 100. A sub-electronic dial 73 is a rotary operation member that is included in the operation unit 70, and is able to move the selected frame, perform image jump and the like. A cross key 74 is an operation member that is included in the operation unit 70, and has a press button capable of being pressed in four directions. Operations that depend on the direction in which the cross key 74 is pressed are possible. A SET button 75 is a press button that is included in the operation unit 70 and is mainly used for setting selected items and the like. A moving image button 76 is used for instructing start and stop of moving image shooting (recording). A voice input button 77 is a button that is able to restrict operation by voice to be enabled only when this button is being pressed, according to the settings of the digital camera 100. In the following description, however, the case where setting values that enable voice to be input irrespective of whether or not the voice input button 77 is being pressed are set and various types of processing operate in response to voice operations will be illustrated to an example. A zoom button 78 is an operation button that is included in the operation unit 70 and is for switching ON and OFF a zoom mode in live view display of a shooting mode. Enlargement and reduction of live view images can be performed, by operating the main electronic dial 71 after setting the zoom mode to ON. In a playback mode, the zoom button 78 functions as a zoom button for enlarging the playback image and increasing the magnification ratio. A play button 79 is an operation button that is included in the operation unit 70 and is for switching between the shooting mode and the playback mode. By pressing the play button 79 during the shooting mode, the mode can be transitioned to the playback mode, and the latest image among the images recorded on a recording medium 200 can be displayed on the display unit 28. A menu button 81 is included in the operation unit 70, and by being pressed, a menu screen that is variously settable is displayed on the display unit 28. The user is able to configure various settings using the menu screen displayed on the display unit 28 and the cross key 74 and SET button 75.

A communication terminal 10 is a communication terminal for the digital camera 100 to communicate with a lens unit 150 (detachable) described later. An eyepiece unit 16 is an eyepiece unit of an eyepiece viewfinder (viewfinder that the user looks into), and video displayed on an internal EVF (Electronic Viewfinder) 29 is visible to the user through the eyepiece unit 16. An eye approach detection unit 57 is an eye approach detection sensor that detects whether the image taker's eye has approached the eyepiece unit 16.

A cover 202 is the cover of a slot that houses the recording medium 200. A grip part 90 is a holding part that is shaped to be easy to grip with the right hand when the user is holding the digital camera 100 ready to shoot. The shutter release 61 and the main electronic dial 71 are disposed in positions that are operable with the index finger of the right hand, in a state where the digital camera 100 is held with the little finger, ring finger and middle finger of the right hand around the grip part 90. Also, the sub-electronic dial 73 is disposed in a position operable with the thumb of the right hand in the same state.

Figure 2:
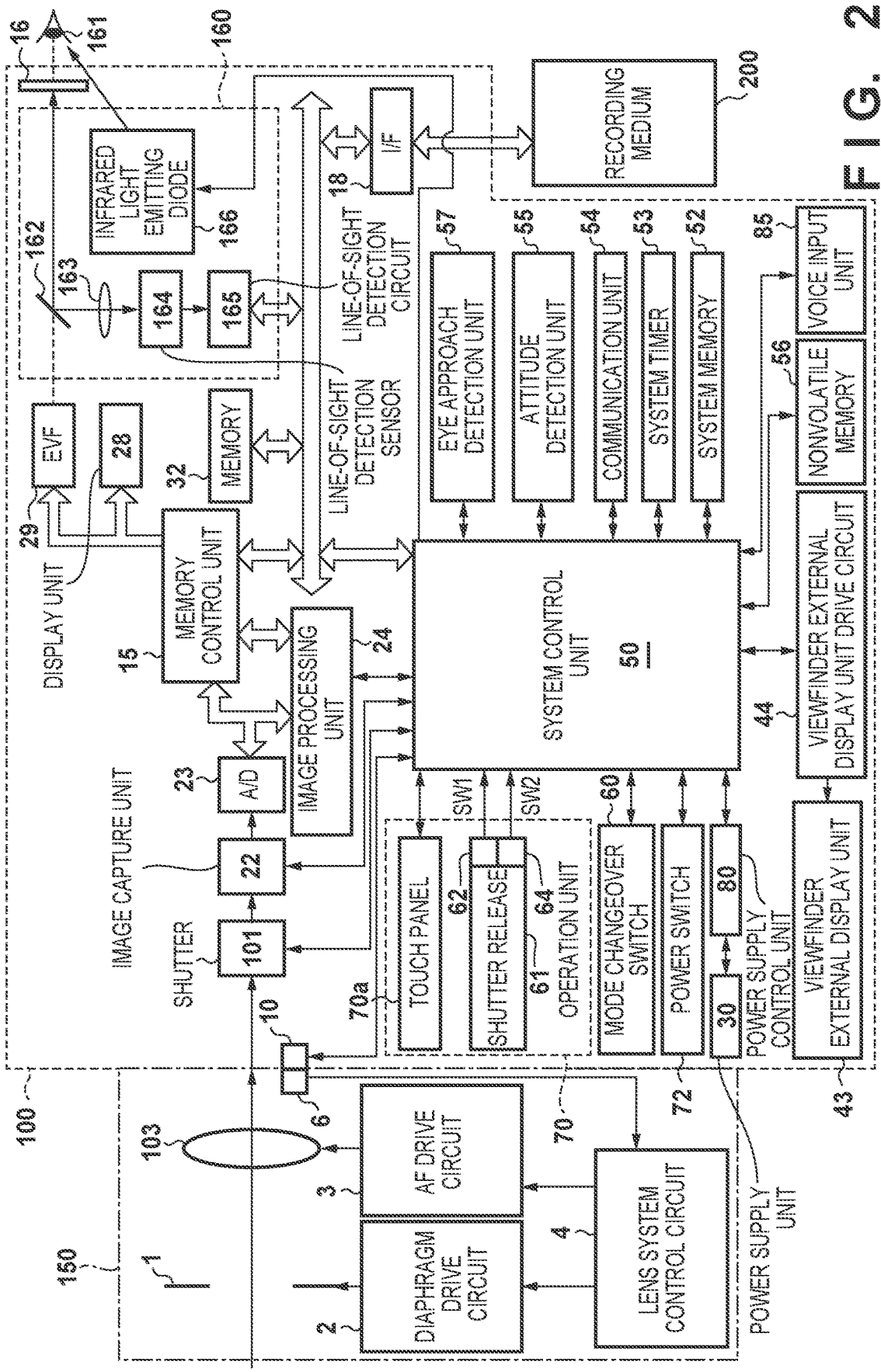
FIG. 2 is a block diagram showing an example functional configuration of the digital camera according to the embodiment.

Next, an example functional configuration of the digital camera 100 according to the present embodiment will be described, with reference to FIG. 2. In FIG. 2, the lens unit 150 is a lens unit that is equipped with an interchangeable shooting lens. The lens 103 is normally constituted by a plurality of lenses, but is simplified here, with only one lens being shown. A communication terminal 6 is a communication terminal for the lens unit 150 to communicate with the digital camera 100. The lens unit 150 communicates with a system control unit 50 via this communication terminal 6 and the aforementioned communication terminal 10, and controls a diaphragm I via a diaphragm drive circuit 2 with an internal lens system control circuit 4. Focusing is performed thereafter by displacing the lens 103, via an AF drive circuit 3.

A shutter 101 is a focal-plane shutter that is able to freely control the exposure time of an image capture unit 22 by the control of the system control unit 50.

The image capture unit 22 is an image sensor that is constituted by a CCD or CMOS device or the like that converts optical images into electrical signals. An A/D converter 23 is used in order to convert analog signals that are output by the image capture unit 22 into digital signals.

An image processing unit 24 performs color conversion processing and predetermined resize processing such as pixel interpolation and reduction on data from the A/D converter 23 or data from a memory control unit 15 described later. Also, the image processing unit 24 performs predetermined computational processing using captured image data. The system control unit 50 performs exposure control and ranging control based on the computation result obtained by the image processing unit 24. TTL (through the lens) AF (autofocus) processing, AE (auto exposure) processing, and EF (electronic flash) processing are thereby performed. The image processing unit 24 further performs predetermined computational processing using captured image data, and performs TTL AWB (auto white balance) processing based on the obtained computation result.

The memory control unit 15 controls data transmission and reception between the A/D convener 23, the image processing unit 24, and a memory 32. The output data from the A/D converter 23 is written to the memory 32 via the image processing unit 24 and the memory control unit 15 or directly via the memory control unit 15. The memory 32 stores image data obtained by the image capture unit 22 and converted into digital data by the A/D converter 23, and image data for displaying on the display unit 28 and the EVF 29. The memory 32 is provided with sufficient storage capacity to store a predetermined number of still images or moving images and audio of a predetermined time length.

Also, the memory 32 doubles as a memory for image display (video memory). Image data for display written to the memory 32 is displayed by the display unit 28 or the EVF 29 via the memory control unit 15. The display unit 28 and the EVF 29 perform display that depends on the signal from the memory control unit 15 on a display device such as an LCD or organic electroluminescent display. Live view display (LV display) can be performed by sequentially transferring data A/D converted by the A/D converter 23 and stored in the memory 32 to the display unit 28 or the EVF 29 and displaying the data. Hereinafter, images that are displayed in live view will be called live view images (LV images).

An infrared light emitting diode 166 is a light emitting element for detecting a line-of-sight position of the user on the viewfinder screen, and irradiates an eyeball (eye) 161 of the user whose eye has approached the eyepiece unit 16 with infrared light. The infrared light emitted by the infrared light emitting diode 166 is reflected by the eyeball (eye) 161, and this infrared reflected light reaches a dichroic mirror 162. The dichroic mirror 162 reflects only infrared light and transmits visible light. The infrared reflected light whose light path has been changed forms an image on an image capture surface of a line-of-sight detection sensor 164 via an image forming lens 163. The image forming lens 163 is an optical member constituting a line-of-sight detection optical system. The line-of-sight detection sensor 164 is constituted by an image device such as a CCD image sensor.

The line-of-sight detection sensor 164 photoelectrically converts incident infrared reflected light into electrical signals and outputs the electrical signals to a line-of-sight detection circuit 165. The line-of-sight detection circuit 165 includes at least one processor, and detects the line-of-sight position of the user from an image or movement of the users eyeball (eye) 161, based on the output signal of the line-of-sight detection sensor 164, and outputs detection information to the system control unit 50. In this way, a line-of-sight detection block 160 is constituted by the dichroic mirror 162, the image forming lens 163, the line-of-sight detection sensor 164, the infrared light emitting diode 166, and the line-of-sight detection circuit 165. The line-of-sight detection block 160 detects the line of sight with a so-called corneal reflection method, for example. The corneal reflection method is a method that involves detecting the orientation and position of the line of sight from the positional relationship between the pupil of the eyeball (eye) 161 and reflected light that occurs due to the infrared light emitted by the infrared light emitting diode 166 being reflected particularly by the cornea of the eyeball (eye) 161. There are various other methods of detecting the orientation and position of the line of sight such as a so-called scleral reflection method that utilizes the difference in light reflectance between the iris and the white of the eye. Note that the line-of-sight detection unit may use any other method besides the above that can detect the orientation and position of the line of sight.

Various setting values of the digital cameras 100 including shutter speed and aperture are displayed on the viewfinder external display unit 43 via a viewfinder external display unit drive circuit 44.

A nonvolatile memory 56 is an electrically erasable recordable memory, and a Flash ROM, for example, is used. Constants, programs and the like for use in operations of the system control unit 50 are stored in the nonvolatile memory 56. Programs as referred to here are computer programs for executing various flowcharts described later in the present embodiment.

The system control unit 50 includes one or more processors, and controls the entire digital camera 100. Each processing of the present embodiment described later is realized, by programs recorded on the nonvolatile memory 56 being extracted to the system memory 52 and executed by the system control unit 50. A RAM, for example, is used for the system memory 52, and constants, variables, programs read out from the nonvolatile memory 56 and the like for use in operations of the system control unit 50 are extracted thereto. The system control unit 50 also performs display control by controlling the memory 32, the display unit 28 and the like.

A system timer 53 is a timing unit for measuring time that is used in various controls and the time of a built-in clock. The mode changeover switch 60, a first shutter switch 62, a second shutter switch 64 and the operation unit 70 function for inputting various types of operating instructions to the system control unit 50. The mode changeover switch 60 switches the operating mode of the system control unit 50 to one of a still image shooting mode, a moving image shooting mode, and the like. Modes of the still image shooting mode include an auto shooting mode, an auto scene differentiation mode, a manual mode, an aperture priority mode (Av mode), a shutter speed priority mode (Tv mode), and a program AE mode (P mode). Also, there are various scene modes configured to shooting scene-specific shooting settings, a custom mode, and the like. Using the mode changeover switch 60, the user is able to directly switch to any of these modes. Alternatively, a configuration may be adopted in which after initially switching to a shooting mode list screen with the mode changeover switch 60, one of the plurality of displayed modes is selected, and switching is performed using another operation member. Similarly, the moving image shooting mode may also include a plurality of modes.

The first shutter switch 62 turns ON with a so-called half press (shooting preparation instruction) when the shutter release 61 provided in the digital camera 100 is partially operated, and generates a first shutter switch signal SW1. Shooting preparation operations such as AF (autofocus) processing, AE (auto exposure) processing, AWB (auto white balance) processing and EF (electronic flash) processing are started with the first shutter switch signal SW1.

The second shutter switch 64 turns ON with a so-called full press (shooting instruction) when the shutter release 61 is fully operated, and generates a second shutter switch signal SW2. The system control unit 50 starts the operations of a series of shooting processing from signal readout from the image capture unit 22 to writing of the captured image to the recording medium 200 as an image file, with the second shutter switch signal SW2.

The operation unit 70 is various types of operation members serving as input units that receive operations from the user. As described above, the operation unit 70 includes the shutter release 61, the touch panel 70a, the main electronic dial 71, the sub-electronic dial 73, the cross key 74, and the SET button 75. The operation unit 70 also includes the moving image button 76, the voice input button 77, the zoom button 78, the play button 79, and the menu button 81.

A power supply control unit 80 is constituted by a battery detection circuit, a DC-DC converter, a switch circuit for switching the block that is electrified, and the like, and detects whether a battery is mounted, the type of battery, and the remaining battery. Also, the power supply control unit 80 controls the DC-DC converter based on the detection results and instructions of the system control unit 50, and supplies a required voltage to various components including the recording medium 200 for a required period. A power supply unit 30 includes a primary battery such as an alkaline battery or a lithium battery, a secondary battery such as a NiCd battery, a NiMH battery or Li battery, and an AC adaptor.

A recording medium I/F 18 is an interface with the recording medium 200, which is a memory card, a hard disk or the like. The recording medium 200 is a recording medium such as a memory card for recording shot images, and is constituted by a semiconductor memory, a magnetic disk or the like.

A communication unit 54 includes a communication circuit or a communication module, for example, is connected wirelessly or by cable, and performs transmission and reception of video signals and audio signals. The communication unit 54 is also capable of connecting to wireless communication for mobile phones, a wireless LAN (Local Area Network), and the Internet. Also, the communication unit 54 is capable of communicating with external devices even with Bluetooth (registered trademark) and Bluetooth (registered trademark) Low Energy. The communication unit 54 is capable of transmitting images (including live view images) captured by the image capture unit 22 and images recorded on the recording medium 200, and is also able to receive images and various other information from external devices.

An attitude detection unit 55 detects the attitude of the digital camera 100 relative to the direction of gravity. An image shot with the image capture unit 22 can be differentiated as being an image shot with the digital camera 100 held horizontally or an image shot with the digital camera 100 held vertically, based on the attitude detected by the attitude detection unit 55. It is possible for the system control unit 50 to add orientation information that depends on the attitude detected by the attitude detection unit 55 to the image file of an image captured by the image capture unit 22, and to rotate and record images. As for the attitude detection unit 55, an acceleration sensor, a gyroscope sensor or the like can be used. It is also possible to detect movement (pan, tilt, lift, whether stationary or not, etc.) of the digital camera 100, using the acceleration sensor, gyroscope sensor or the like serving as the attitude detection unit 55.

The eye approach detection unit 57 is an eye approach detection sensor that detects that the eye (object) 161 has moved closer to (approached) or has moved away (withdrawn) from the eyepiece unit 16 of the viewfinder (approach detection). The system control unit 50 switches between display (display state)/non-display (non-display state) of the display unit 28 and the EVF 29, according to the state detected by the eye approach detection unit 57. More specifically, at least in the case where the digital camera 100 is in a shooting standby state and the setting for switching the display destination of live view images captured by the image capture unit 22 is set to automatic switching, display is set to ON with the display unit 28 as the display destination and the EVF 29 is set to non-display, when the eye has not approached the eyepiece unit 16. Also, display is set to ON with the EVF 29 as the display destination and the display unit 28 is set to non-display, when the eye has approached the eyepiece unit 16. An infrared proximity sensor, for example, can be used for the eye approach detection unit 57, and the eye approach detection unit 57 is able to detect the approach of an object of some sort to the eyepiece unit 16 of the viewfinder that incorporates the EVF 29. In the case where an object has approached the eyepiece unit 16, infrared light projected from a projection unit (not shown) of the eye approach detection unit 57 is reflected and received by a light receiving unit (not shown) of the infrared proximity sensor. The eye approach detection unit 57 is also able to differentiate how close an object has approached to the eyepiece unit 16 (eye approach distance), depending on the amount of infrared light that is received. In this way, the eye approach detection unit 57 performs eye approach detection for detecting the proximity distance of an object to the eyepiece unit 16. Note that, in the present embodiment, the projection unit and light receiving unit of the eye approach detection unit 57 are separate devices to the aforementioned infrared light emitting diode 166 and line-of-sight detection sensor 164. The infrared light emitting diode 166 may, however, also serve as the projection unit of the eye approach detection unit 57. Furthermore, the line-of-sight detection sensor 164 may also serve as the light receiving unit. The case where an object that approaches within a predetermined distance to the eyepiece unit 16 is detected from a non-eye approached state (non-approached state) will be taken as detecting that the user's eye has approached the eyepiece unit 16. The case where an object whose approach was detected moves away by the predetermined distance or more from an eye approached state (approached state) will be taken as detecting that the user's eye has withdrawn from the eyepiece unit 16. The threshold for detecting the approach of the user's eye and the threshold for detecting the withdrawal of the user's eye may differ due to providing hysteresis, for example. Also, from after it is detected that the user's eye has approached until when it is detected that the user's eye has withdrawn will be taken as the eye approached state. From after it is detected that the user's eye has withdrawn until when it is detected that the user's eye has approached will be taken as the non-eye approached state. Note that the infrared proximity sensor is given as an example, and any sensor that is able to detect the approach of an eye or an object that is viewed as the user's eye having approached the eyepiece unit 16 may be employed for the eye approach detection unit 57.

The system control unit 50 is able to detect the following operations or states based on the output from the line-of-sight detection block 160.

Line of sight of the user whose eye has approached the eyepiece unit 16 being newly input (detected). That is, the start of line-of-sight input.

State where there is line-of-sight input of the user whose eye has approached the eyepiece unit 16.

State where the user whose eye has approached the eyepiece unit 16 is gazing steadily.

Line of sight of the user whose eye has approached the eyepiece unit 16 having shifted. That is, the end of line-of-sight input.

State where there is no line-of-sight input of the user whose eye has approached the eyepiece unit 16.

The steady gaze described here refers to the case where the line-of-sight position of the user has not exceeded a predetermined amount of movement within a predetermined time.

The touch panel 70a and the display unit 28 can be integrally constituted. For example, the touch panel 70a is constituted such that the transmissivity of light does not interfere with display on the display unit 28, and is attached to the upper layer of the display surface of the display unit 28. Input coordinates of the touch panel 70a are associated with display coordinates on the display screen of the display unit 28. GUIs (graphical user interfaces) that appear as though the user is directly operating the screen displayed on the display unit 28 can thereby be provided. The system control unit 50 is able to detect the following operations on the touch panel 70a or states of the touch panel 70a.

Finger or pen that was not touching the touch panel 70a newly touching the touch panel 70a. That is, the start of touching (hereinafter, referred to as a touch-down).

State where a finger or pen is touching the touch panel 70a (hereinafter, referred to as a touch-on).

Finger or pen moving while touching the touch panel 70a (hereinafter, referred to as a touch-move).

Finger or pen that was touching the touch panel 70a being lifted. That is, the end of touching (hereinafter, referred to as a touch-up).

State where nothing is touching the touch panel 70a (hereinafter, referred to as a touch-off).

A touch-on is also simultaneously detected when a touch-down is detected. A touch-on is normally continuously detected after a touch-down, as long as a touch-up is not detected. A touch-move is also detected in a state where a touch-on is being detected. Even when a touch-on is being detected, a touch-move is not detected unless the touch position moves. A touch-off is after a touch-up of all fingers and pens that were touching has been detected.

These operations and states and the position coordinates where a finger or pen is touching the touch panel 70a are notified to the system control unit 50 through an internal bus. The system control unit 50 determines what kind of operation (touch operation) was performed on the touch panel 70a based on the notified information. With regard to a touch-move, the movement direction of the finger or pen that moves on the touch panel 70a can also be determined for every vertical component and horizontal component on the touch panel 70a, based on the change in the position coordinates. The case where a touch-move being performed for a predetermined distance or more is detected will be taken as determining that a slide operation has been performed. An operation that involves quickly moving only a certain distance with a finger touching the touch panel and then directly lifting the finger is called a flick. A flick is, in other words, an operation that involves quickly tracing over the touch panel 70a as if flicking the touch panel 70a with a finger. When a touch-move being performed for a predetermined distance or more at a predetermined speed or more is detected, followed directly by a touch-up being detected, it can be determined that a flick was performed (it can be determined that there was a flick following a slide operation). Furthermore, a touch operation that involves a plurality of places (e.g., two points) being touched simultaneously and the touch positions being moved closer together is called a pinch-in, and a touch operation that involves the plurality of touch positions being moved further apart is called a pinch-out. The pinch-out and the pinch-in are collectively referred to as a pinch operation (or simply a pinch). Any of touch panels employing various methods may be used for the touch panel 70a, such as a resistive touch panel, a capacitive touch panel, a surface acoustic wave touch panel, an infrared touch panel, an electromagnetic induction touch panel, an image recognition touch panel, and an optical sensor touch panel. Depending on the method, contact with the touch panel is detected as a touch or a finger or pen approaching the touch panel is detected as a touch, and either method may be used.

A voice input unit 85 includes an unillustrated microphone, and performs processing for acquiring ambient sounds around the digital camera and voice instructions from the user described later. Also, the present invention is applicable not only to the digital camera itself but also to a control device that communicates with the digital camera (including a network camera) via wired or wireless communication and remotely controls the digital camera. As for devices that control a digital camera remotely, there are devices such as smartphones, tablet PCs and desktop PCs, for example. The digital camera is controllable from a remote location, by notifying commands that cause the digital camera to perform various operations and configure various settings from the control device side, based on operations performed on the control device side and processing performed on the control device side. Also, a configuration may be adopted in which live view images shot with the digital camera can be received via wired or wireless communication and displayed on the control device side.

Series of Operations of Main Processing

Figure 3A:
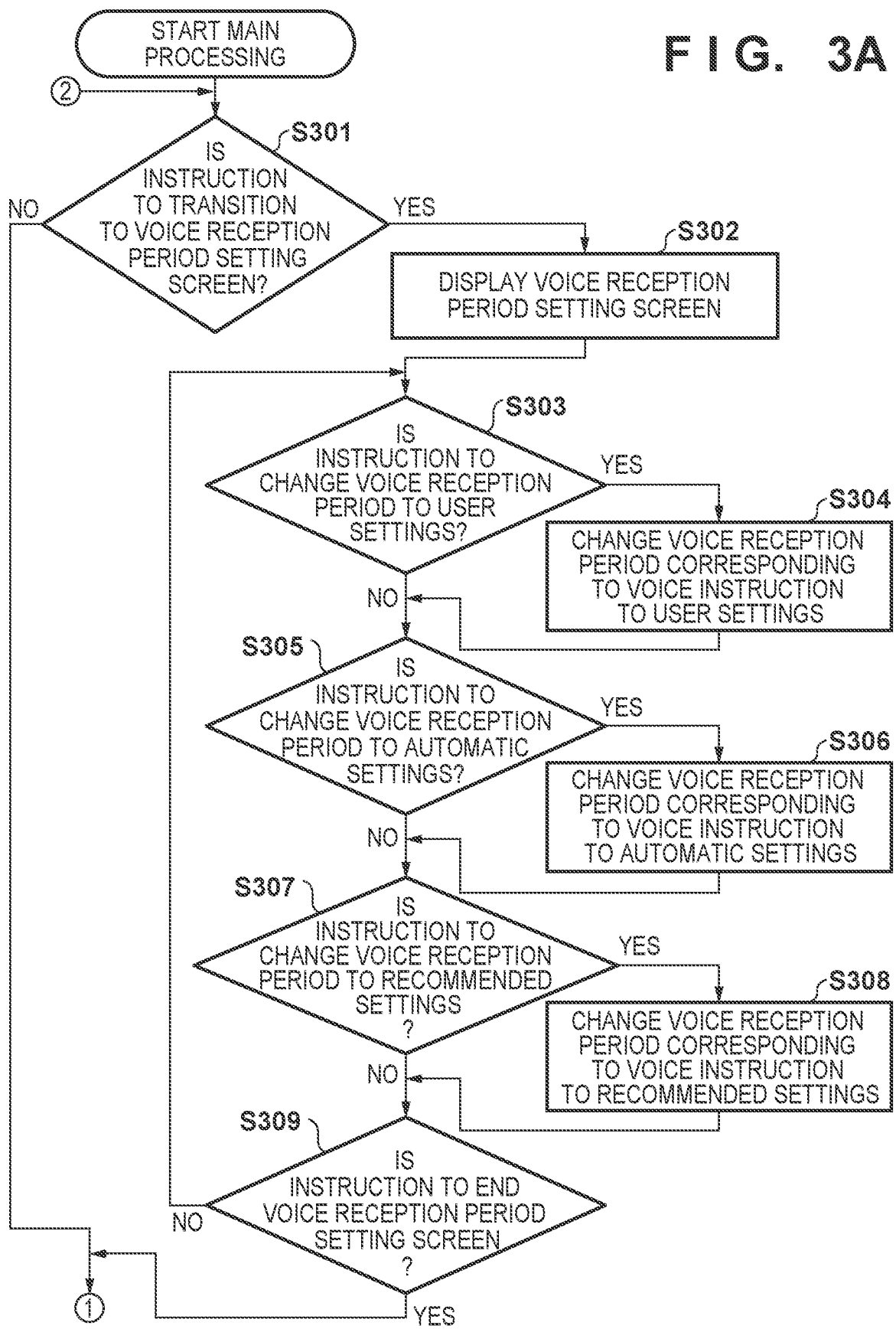
FIGS. 3A and 3B are flowcharts showing a series of operations of main processing according to the embodiment.
Figure 3B:
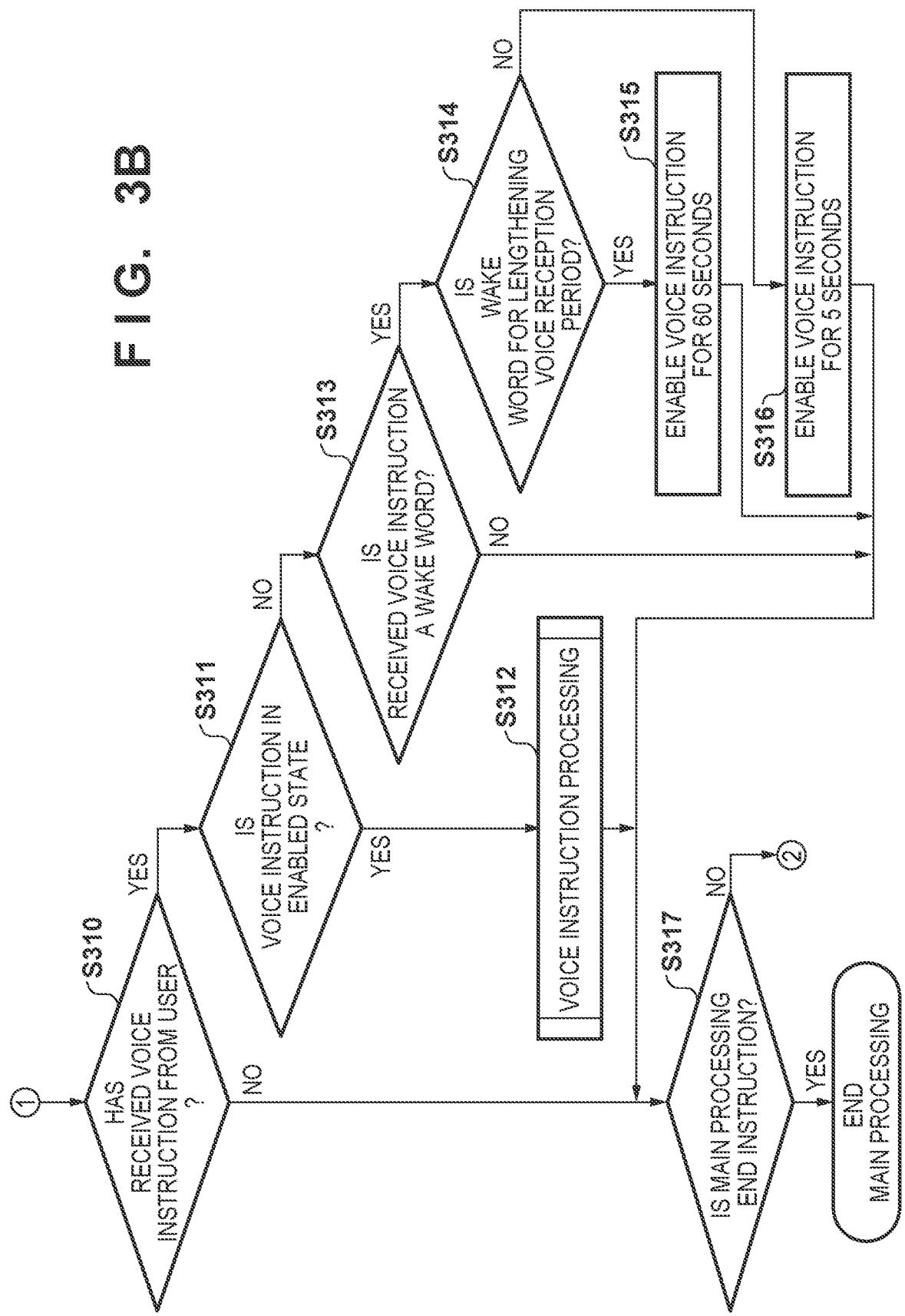

Next, the main processing according to the present embodiment will be described with reference to FIGS. 3A and 3B. Operations of the main processing are operations from when a voice reception period is set on a voice reception period setting screen and voice inputs are enabled with a wake word until when a voice operation is completed. Note that each processing of the main processing is realized by programs stored in the nonvolatile memory 56 being extracted to the system memory 52 and executed by the system control unit 50. A wake word is a specific voice instruction for enabling operation by voice on the digital camera 100.

In step S301, the system control unit 50 determines whether an instruction to transition to the voice reception period setting screen was given. The system control unit 50 advances to step S302 if it is determined that an instruction to transition to the voice reception period setting screen was given, and advances to step S310 if that is not the case.

In step S302, the system control unit 50 displays the voice reception period setting screen on the display unit 28. FIGS. 4A and 4B show an example of the voice reception period setting screen that is displayed on the display unit 28. Voice instructions whose voice reception period is individually settable are displayed on the screen shown in FIG. 4A. The voice reception period setting corresponding to each voice instruction is displayed alongside the voice instruction. The screen shown in FIG. 4B illustrates an example in a setting state of setting the voice reception period for one voice instruction. The voice reception period settable for one voice instruction can be set by selecting one of "recommended setting", "user setting" and "automatic setting", for example. "Recommended setting" is a standard value set in advance as an initial value in the digital camera 100. "User setting" is a setting that enables the user himself or herself to change the voice reception period corresponding to the voice instruction. For example, the user is able to set a desired voice reception period, by turning the dial of the operation unit 70. That is, the voice reception period setting screen is a screen related to manual setting that enables the user to set different periods for different voice instructions.

"Automatic setting" is a setting that enables the voice reception period to be set automatically based on the actual interval of instructions issued by the user (i.e., based on the history of past instructions). The relationship between voice instructions and voice reception periods selectable for the different types of instructions is represented as a table shown in FIG. 5A, for example.

In step S303, the system control unit 50 determines whether an instruction to change the voice reception period corresponding to the voice instruction to the user setting was given. The system control unit 50 advances to step S304 if it is determined that an instruction to change the voice reception period corresponding to the voice instruction to the user setting was given, and advances to step S305 if that is not the case. Note that, in this step, "guidance page forward", "photo page forward", "check Tv value", and "check Av value" are illustrated as example voice instructions, but the voice instructions are not limited thereto and other types may be included. Note that, in the abovementioned example, in the case where "page forward" is instructed by the user, the system control unit 50 indicates that processing is possible during the corresponding voice reception period, according to whether the current content display mode of the digital camera 100 is "guidance" or "photo". Operations that depend on the current operating mode of the digital camera 100 are also enabled on content other than "guidance" and "photo". In step S304, the system control unit 50 changes the voice reception period corresponding to the voice instruction to a value set by the user and stores the value in the memory 32 (or in the system memory 52; this similarly applies below), for example.

In step S305, the system control unit 50 determines whether an instruction to change the voice reception period corresponding to the voice instruction to the automatic setting was given. The system control unit 50 advances to step S306 if an instruction to change the voice reception period corresponding to the voice instruction to the automatic setting was given, and advances to step S307 if that is not the case. In step S306, the system control unit 50 changes the voice reception period corresponding to the voice instruction to a value calculated automatically, and stores the value in the memory 32. Note that the voice reception period is automatic calculated depending on the time interval between voice instructions, but there are cases where the time interval cannot be calculated, such as a voice instruction not yet having been given. In this case, the recommended setting value is input as the calculated value of the automatic setting.

In step S307, the system control unit 50 determines whether an instruction to change the voice reception period corresponding to the voice instruction to the recommended setting was given. The system control unit 50 advances to step S308 if it is determined that an instruction to change the voice reception period corresponding to the voice instruction to the recommended setting was given, and advances to step S309 if that is not the case. In step S308, the system control unit 50 changes the voice reception period corresponding to the voice instruction to the recommended setting, and stores the value thereof in the memory 32.

In step S309, the system control unit 50 determines whether an instruction to end the voice reception period setting screen was given. The system control unit 50 advances to step S310 if it is determined that an instruction to end the voice reception period setting screen was given, and returns to step S303 if that is not the case.

In step S310, the system control unit 50 determines whether a voice instruction was received from the voice input unit 85. The system control unit 50 advances to step S311 if it is determined that a voice instruction was received based on a signal from the voice input unit 85, and advances to step S317 if that is not the case.

In step S311, the system control unit 50 determines whether operation by voice instruction is in an enabled state. The system control unit 50 advances to step S312 if it is determined that operation by voice instruction is enabled, according to the state of settings on the digital camera 100, for example, and advances to step S313 if it is determined that operation by voice instruction is not in an enabled state.

In step S312, the system control unit 50 executes voice instruction processing. The specific processing of the voice instruction processing will be described later. In step S313, the system control unit 50 determines whether the received voice instruction is a wake word. For example, in the case where the recognition result of performing recognition on the received voice matches a wake word determined in advance, the system control unit 50 determines that the received voice instruction is a wake word and advances to step S314. On the other hand, if it is determined that the received voice instruction indicates other than a wake word, the system control unit 50 advances to step S317.

In step S314, the system control unit 50 determines whether the received wake word is a wake word for lengthening the voice reception period. The system control unit 50 advances to step S315 if it is determined that the received wake word is a word for lengthening the voice reception period, and advances to step S316 if it is determined that the wake word is not a word for lengthening the voice reception period. For example, the system control unit 50 identifies two wake words for controlling the length of the voice reception period. "Ok Voice Input", for example, is set as a first wake word indicating the normal length as the length of the voice reception period. Also, "Ok Voice Input For A Long Time", for example, is set as a second wake word for setting the voice reception period to longer than the normal length. Adopting such a configuration enables the user to control the voice reception period using wake words.

In step S315, the system control unit 50 enables operation by voice instruction for 60 seconds, for example, in order to lengthen the voice reception period. On the other hand, in step S316, the system control unit 50 enables operation by voice instruction for 5 seconds, for example, in order to keep the voice reception period short.

In step S317, the system control unit 50 determines whether a main processing end instruction, such as turning off the power switch 72, for example, was given. If it is determined that a main processing end instruction was given, the system control unit 50 ends the series of operations related to the main processing. If that is not the case, the system control unit 50 advances to step S301 in order to repeat the abovementioned processing. Note that, in the case where an anomalous operation such as the mode dial or the like being turned is performed in the operations of the main processing, the system control unit 50 may interrupt the operations of the main processing being performed.

Series of Operations of Voice Instruction Processing

Figure 6A:
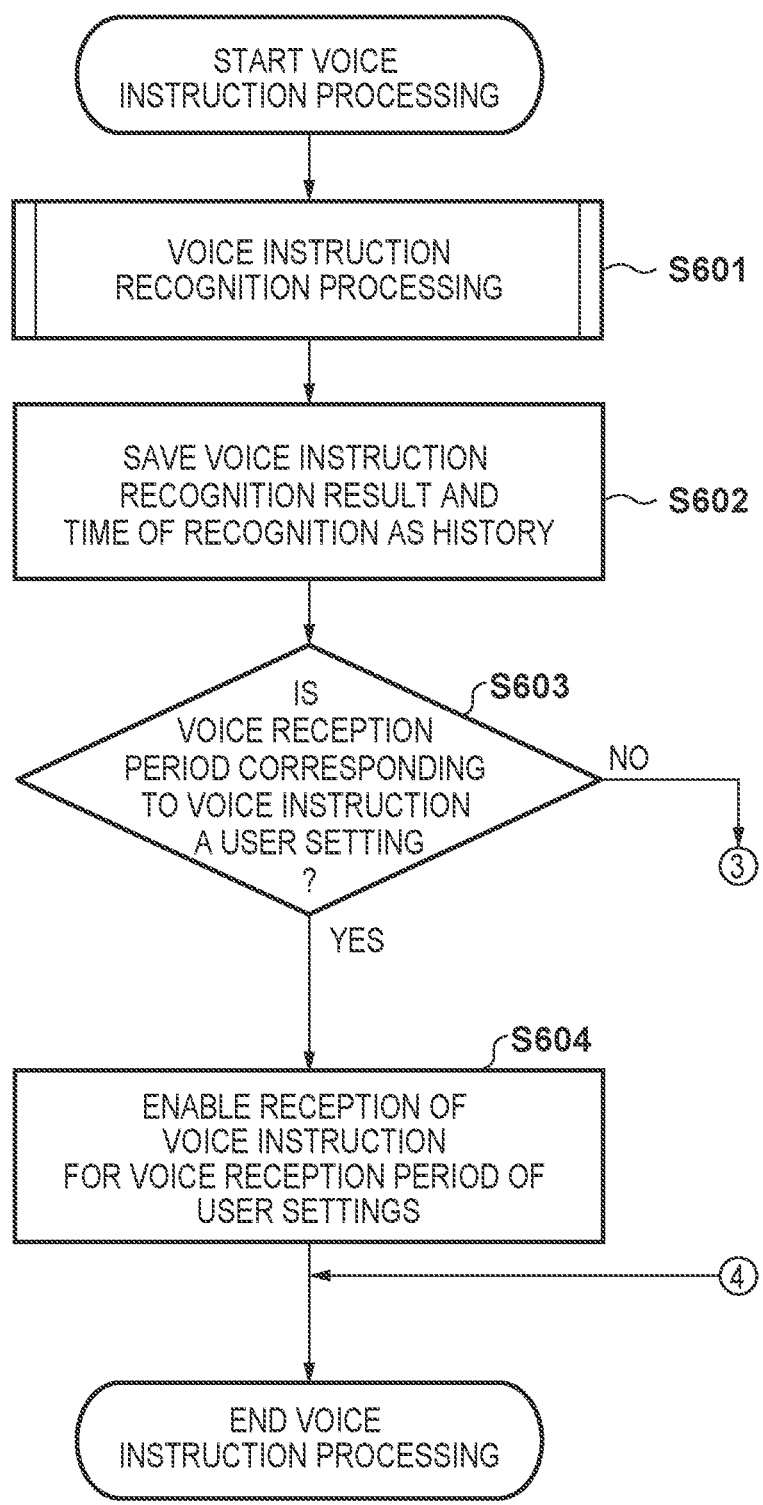
FIGS. 6A and 6B are flowcharts showing a series of operations of voice instruction processing according to the present embodiment.
Figure 6B:
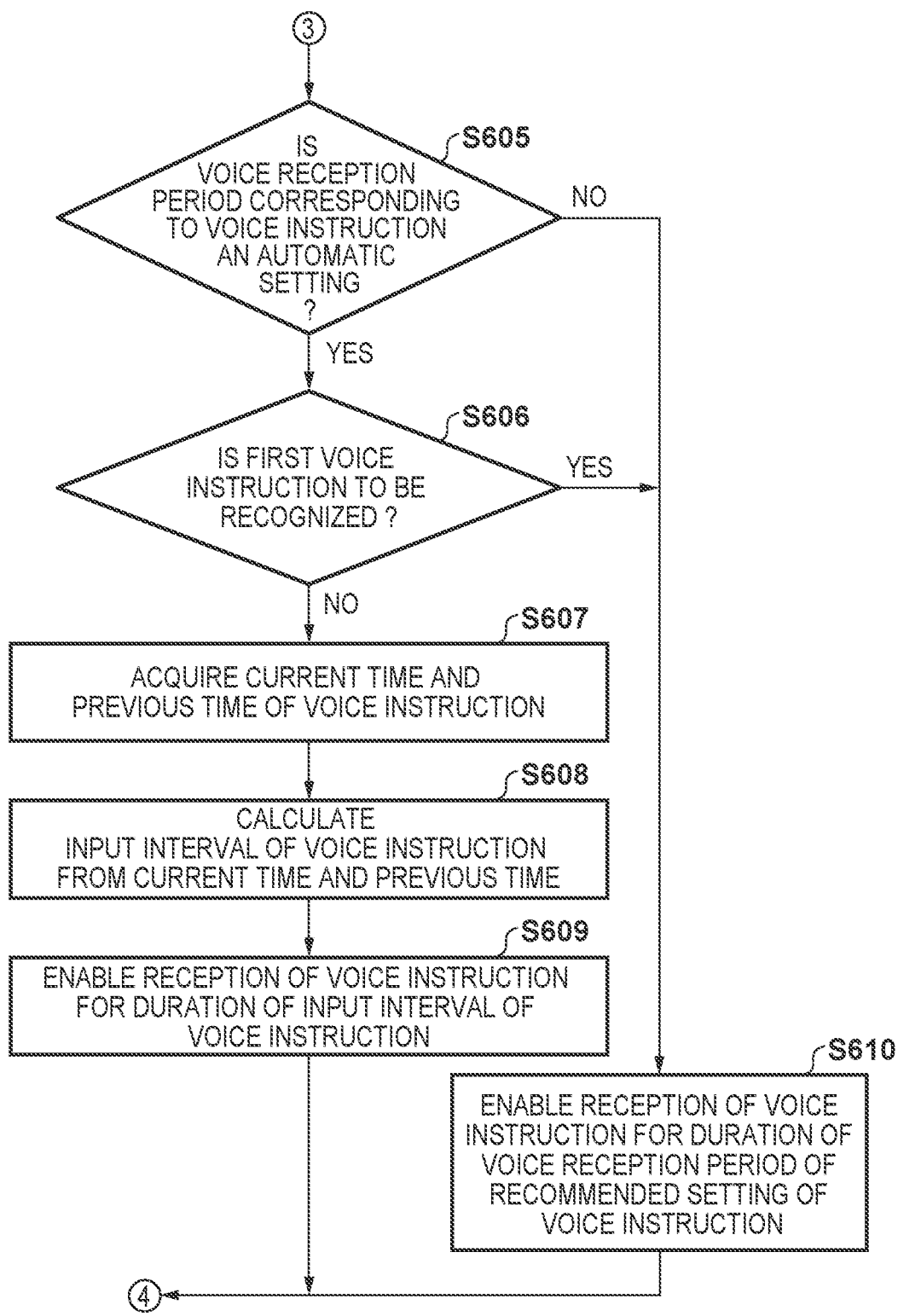

Next, the series of operations of the voice instruction processing that is executed in step S312 will be described, with reference to FIGS. 6A and 6B. The operations of the voice instruction processing shown in FIGS. 6A and 6B are operations from when processing for recognizing the voice instruction is performed until when the period for which voice instructions are enabled is updated. The voice instruction processing is realized by the system control unit 50 executing a program stored in the nonvolatile memory 56, similarly to the main processing.

In step S601, the system control unit 50 executes voice instruction recognition processing. Operations related to the voice instruction recognition processing will be described later. In step S602, the system control unit 50 saves the voice instruction determined as the recognition result of the voice instruction recognition processing and the time corresponding to the voice instruction in the memory 32 as a history.

In step S603, the system control unit 50 determines whether the voice reception period corresponding to the voice instruction is a period of "user setting". The system control unit 50 advances to step S604 if it is determined that the voice reception period corresponding to the voice instruction is a period of "user setting", and advances to step S605 if it is determined that the voice reception period corresponding to the voice instruction is set to other than "user setting". In step S604, the system control unit 50 enables reception of voice instructions for the voice reception period of the user setting.

In step S605, the system control unit 50 determines whether the voice reception period corresponding to the voice instruction recognition result is set to "automatic setting". The system control unit 50 advances to step S606 if it is determined that the voice reception period corresponding to the voice instruction is set to "automatic setting", and advances to step S610 if the voice reception period corresponding to the voice instruction is not set to "automatic setting".

In step S606, the system control unit 50 determines whether the voice instruction is the first voice instruction to be recognized. The system control unit 50 compares the voice instruction for processing with voice instructions saved in the memory 32, and, if a matching voice instruction does not exist, determines that the voice instruction is the first voice instruction to be recognized and advances to step S610. On the other hand, if the voice instruction for processing matches a voice instruction in the memory 32, the system control unit 50 determines that the voice instruction is not the first voice instruction to be recognized and advances to step S607.

In step S607, the system control unit 50 acquires the current time and previous time that recognized voice instructions were input from the memory 32. In step S608, the system control unit 50 calculates the input interval of voice instructions from the current time and previous time that recognized voice instructions were input. The case where, for example, the system control unit 50 simply calculates the input interval from the difference between the current time and previous that voice instructions were input will be described as an example, as shown in FIG. 5B. However, another method of calculating the input interval of voice instructions may be used, such as calculating the average value or median value of the input intervals of voice instructions from past history information.

In step S609, the system control unit 50 enables reception of voice instructions for the duration of the input interval of the recognized voice instruction. In step S610, the system control unit 50 enables reception of voice instructions for the duration of the voice reception period of the recommended setting corresponding to the recognized voice instruction. Note that, in the case where an anomalous operation such the mode dial or the like being turned is performed during the voice instruction processing, the series of operations being performed may be interrupted.

Series of Operations of Voice Instruction Recognition Processing

Figure 7:
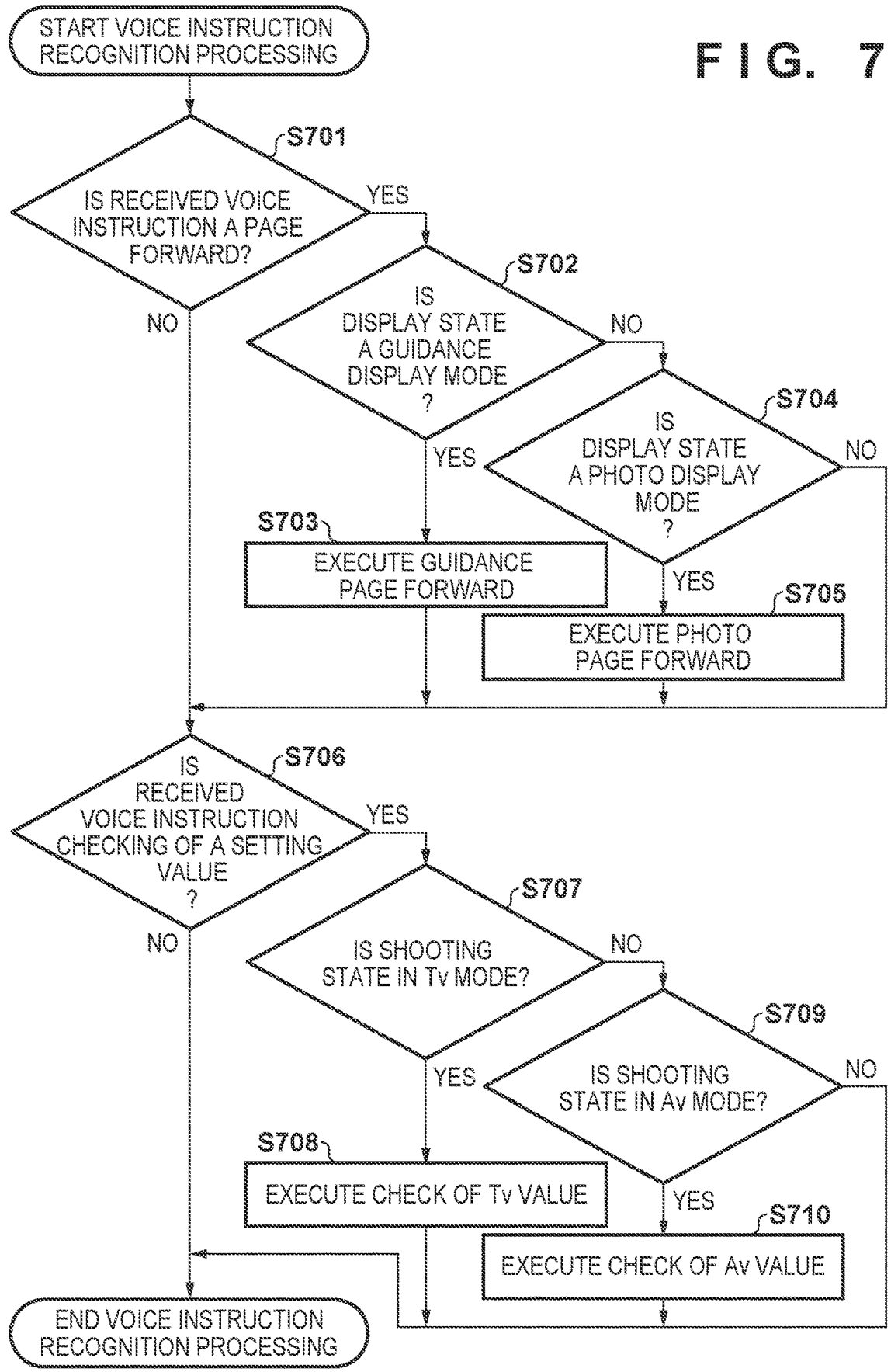
FIG. 7 is a flowchart showing a series of operations of voice instruction recognition processing of the present embodiment.

Furthermore, the series of operations of the voice instruction recognition processing that is executed in step S601 will be described, with reference to FIG. 7. The operations of the voice instruction recognition processing are operations from when recognition of a voice instruction is started until when a voice operation is executed. This processing is realized by the system control unit 50 executing a program, similarly to the other processing.

In step S701, the system control unit 50 determines whether the received voice instruction is a voice instruction relating to page forward. The system control unit 50 performed known voice recognition processing, and advances to step S702 if it is determined that the received voice instruction indicates page forward, and advances to step S706 if it is determined that the received voice instruction does not indicate page forward.

In step S702, the system control unit 50 determines whether the display state of the digital camera 100 is a guidance content display mode. Specifically, if it is determined that the display state of the digital camera 100 is the guidance content display mode, based on setting values of the digital camera 100, the system control unit 50 advances to step S703. On the other hand, if it is determined that the display state of the digital camera 100 is not the guidance content display mode, the system control unit 50 advances to step S704. That is, in the case where, when a voice instruction is input, the digital camera 100 is in a state (operating mode) corresponding to the input voice instruction, the system control unit 50 executes processing corresponding to the voice instruction. On the other hand, the system control unit 50 does not execute processing corresponding to the voice instruction, in the case where the digital camera 100 is not in a state (operating mode) corresponding to the input voice instruction.

In step S703, the system control unit 50 executes guidance page forward. For example, FIGS. 8A to 8C illustrate an example of guidance page forward in the present embodiment. FIG. 8A shows a top page of a voice input help guide screen, FIG. 8B shows a middle page of the voice input help guide screen, and FIG. 8C shows an end page of the voice input help guide screen. In the case where the system control unit. 50 executes page forward on the voice input help guide screen (e.g., forwarding the page from FIG. 8A sequentially to FIG. 8C), the user is tasked with reading and confirming the text between the previous page forward and the next page forward. Thus, it is assumed that the time for the user to confirm text content is longer than the case where the user confirms a photo. Accordingly, as shown in FIGS. 5A and 5B, the voice reception period for guidance page forward that is controlled by the system control unit 50 is longer than the voice reception period for photo page forward.

In step S704, the system control unit 50 determines whether the display state of the digital camera 100 is a photo content display mode. Specifically, if it is determined that the display state of the digital camera 100 is the photo content display mode, based on setting values of the digital camera 100, the system control unit 50 advances to step S705. On the other hand, if it is determined that the display state of the digital camera 100 is not the photo content display mode, the system control unit 50 advances to step S706.

Figure 9:
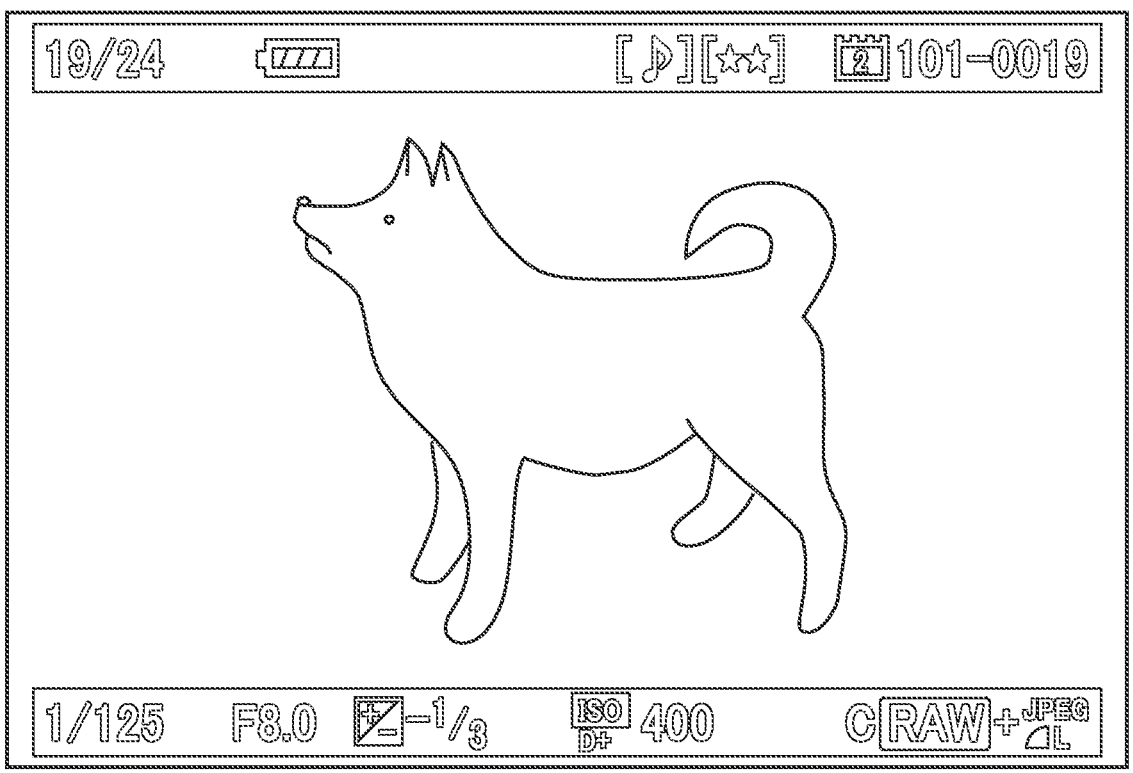
FIG. 9 is a diagram showing an example of a photo playback screen of the present embodiment.

In step S705, the system control unit 50 executes photo page forward. FIG. 9 illustrates an example of a photo playback screen. In the case where the system control unit 50 executes page forward on photos, the user is tasked with confirming a photo between page forwards, although it is assumed that the confirmation time for the user is short compared with guidance page forward. Thus, accordingly, as shown in FIGS. 5A and 5B, the voice reception period for photo page forward that is controlled by the system control unit 50 is shorter than the voice reception period for guidance page forward.

In step S706, the system control unit 50 determines whether the received voice instruction is checking of a setting value. The system control unit 50 advances to step S707 if it determined that the voice instruction is checking of a setting value, and ends the voice instruction recognition processing if it is determined that the received voice instruction is not checking of a setting value.

In step S707, the system control unit 50 determines whether the current shooting state of the digital camera 100 is the shutter speed priority mode (Tv mode). For example, if it is determined that the current shooting state of the digital camera 100 is the shutter speed priority mode (Tv mode), based on setting values of the digital camera 100, the system control unit 50 advances to step S708. On the other hand, if it is determined that the current shooting state of the digital camera 100 is not the shutter speed priority mode (Tv mode), the system control unit 50 advances to step S709.

In step S708, the system control unit 50 acquires the shutter value and displays the acquired shutter value on the display unit 28, for example, so that the user is able to check the shutter speed setting value. In step S709, the system control unit 50 determines whether the current shooting state of the digital camera 100 is the aperture priority mode (Av mode). For example, if it is determined that the current shooting state of the digital camera 100 is the aperture priority mode (Av mode), based on setting values of the digital camera 100, the system control unit 50 advances to step S710. On the other hand, if it is determined that the current shooting state of the digital camera 100 is not the aperture priority mode (Av mode), the system control unit 50 ends the voice instruction recognition processing.

In step S710, the system control unit 50 acquires the aperture value and displays the acquired aperture value on the display unit 28, for example, so that the user is able to check the aperture setting value. Note that, in the case where an anomalous operation such as the mode dial or the like being turned is performed during the voice instruction recognition processing, the operations being performed may be interrupted.

In the present embodiment as described above, a configuration is adopted in which the system control unit 50, upon reception of a received voice instruction, sets a suitable voice reception period according to the type of voice instruction that is recognized or the contents of the voice instruction. That is, in a configuration in which, in the case where a voice instruction for performing an operation is input in a predetermined period after the previous voice instruction was input, processing corresponding to the voice instruction for performing an operation is executed, the length of the period for receiving a voice instruction is changed, according to (the type or contents of) the previous voice instruction. By adopting such a configuration, it becomes possible to improve the operability of voice operations according to input voice instructions, and to minimize erroneous operations when performing voice operations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018210, filed Feb. 5, 2020 which is hereby incorporated by reference herein in its entirety.

What is claimed is:

1. A camera configured to set a length for a predetermined period for receiving a second voice instruction after receiving a first voice instruction, comprising:
   a microphone configured to input voice instructions;
   a memory configured to store program instructions; and
   one or more processors configured to execute the program instructions to function as:
      a control unit configured to perform control to:
         receive the first voice instruction through the microphone, the first voice instruction being a wake word, of a plurality of wake words, for enabling operation by voice on the camera, the plurality of wake words including a first wake word for setting the length for the predetermined period to a first length representing a normal length and a second wake word for setting the length for the predetermined period to a second length longer than the normal length;

determine whether the received first voice instruction corresponds to the first wake word or the second wake word:

set the length for the predetermined period for receiving the second voice instruction to the first length in a case where it is determined that the received first voice instruction is the first wake word and to the second length in a case where it is determined that the received first voice instruction is the second wake word; and in a case where the second voice instruction for operating the camera is input in the predetermined period after the first voice instruction is input to the camera, execute processing corresponding to the second voice instruction.

2. The voice input apparatus according to claim 1, wherein the one or more processors further execute the instructions to function as a manual setting unit configured to enable a user to set the length for the predetermined period to different values for different voice instructions included in the first voice instruction.

3. The voice input apparatus according to claim 1, wherein the one or more processors further execute the instructions to function as an automatic setting unit configured to set the length for the predetermined period to different values for different voice instructions included in the first voice instruction, based on a history of past voice instructions.

4. The voice input apparatus according to claim 3, wherein the history of past voice instructions includes an input interval between a plurality of voice instructions.

5. The voice input apparatus according to claim 1, wherein the control unit is further configured to execute processing corresponding to the second voice instruction in a case where, when the second voice instruction is input, the voice input apparatus is in a state corresponding to the input second voice instruction, and configured not to execute processing corresponding to the second voice instruction in a case where the voice input apparatus is not in the state corresponding to the input second voice instruction.

6. The voice input apparatus according to claim 5, wherein the state corresponding to the second voice instruction includes an operating mode of the voice input apparatus.

7. The voice input apparatus according to claim 1, wherein an operating mode of the voice input apparatus includes a mode for displaying content on a display unit of the voice input apparatus, and a mode for displaying a setting value of the voice input apparatus on the display unit of the voice input apparatus.

8. A control method of a camera configured to set a length for a predetermined period for receiving a second voice instruction after receiving a first voice instruction, the camera comprising a microphone configured to input voice instructions, the control method comprising:

receiving the first voice instruction through the microphone, the first voice instruction being a wake word, of a plurality of wake words, for enabling operation by voice on the camera, the plurality of wake words including a first wake word for setting the length for the predetermined period to a first length representing a normal length and a second wake word for setting the length for the predetermined period to a second length longer than the normal length;

determining whether the received first voice instruction corresponds to the first wake word or the second wake word:

setting the length for the predetermined period for receiving the second voice instruction to the first length in a case where it is determined that the received first voice instruction is the first wake word and to the second length in a case where it is determined that the received first voice instruction is the second wake word; and in a case where the second voice instruction for operating the camera is input in the predetermined period after the first voice instruction is input to the camera, executing processing corresponding to the second voice instruction.

9. A non-transitory computer-readable storage medium comprising instructions for performing a control method of a camera configured to set a length for a predetermined period for receiving a second voice instruction after receiving a first voice instruction, the camera comprising a microphone configured to input voice instructions, the control method comprising:

receiving the first voice instruction through the microphone, the first voice instruction being a wake word, of a plurality of wake words, for enabling operation by voice on the camera, the plurality of wake words including a first wake word for setting the length for the predetermined period to a first length representing a normal length and a second wake word for setting the length for the predetermined period to a second length longer than the normal length-determining whether the received first voice instruction corresponds to the first wake word or the second wake word:

setting the length for the predetermined period for receiving the second voice instruction to the first length in a case where it is determined that the received first voice instruction is the first wake word and to the second length in a case where it is determined that the received first voice instruction is the second wake word; and in a case where the second voice instruction for operating the camera is input in the predetermined period after the first voice instruction is input to the camera, executing processing corresponding to the second voice instruction.

* * * * *